United States Patent
Kang et al.

(10) Patent No.: US 10,316,188 B2
(45) Date of Patent: *Jun. 11, 2019

(54) THERMOPLASTIC RESIN COMPOSITION AND MOLDED PART FOR AUTOMOBILES USING THE SAME

(71) Applicant: Lotte Advanced Materials Co., Ltd., Yeosu-si (KR)

(72) Inventors: Hyoung Taek Kang, Uiwang-si (KR); Jae Youp Chung, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 76 days.

This patent is subject to a terminal disclaimer.

(21) Appl. No.: 14/972,300

(22) Filed: Dec. 17, 2015

(65) Prior Publication Data

US 2016/0177093 A1    Jun. 23, 2016

(30) Foreign Application Priority Data

Dec. 19, 2014 (KR) .................. 10-2014-0184354
Nov. 6, 2015 (KR) .................. 10-2015-0156103

(51) Int. Cl.
| | | |
|---|---|---|
| C08L 77/06 | (2006.01) | |
| C08K 5/1539 | (2006.01) | |
| C08K 5/17 | (2006.01) | |
| C08K 7/14 | (2006.01) | |
| C08L 77/02 | (2006.01) | |

(52) U.S. Cl.
CPC ............ *C08L 77/06* (2013.01); *C08K 5/1539* (2013.01); *C08K 5/175* (2013.01); *C08K 7/14* (2013.01); *C08L 77/02* (2013.01); *C08L 2201/08* (2013.01); *C08L 2205/025* (2013.01); *C08L 2205/06* (2013.01)

(58) Field of Classification Search
CPC ....... C08L 77/06; C08L 77/02; C08K 5/1539; C08K 5/175; C08K 7/14
See application file for complete search history.

(56) References Cited

U.S. PATENT DOCUMENTS

| 4,602,058 | A | 7/1986 | Graham et al. |
| 8,618,209 | B2 | 12/2013 | Lee et al. |
| 2012/0196962 | A1 | 8/2012 | Kobayashi et al. |
| 2013/0197145 | A1 | 8/2013 | Thompson et al. |

FOREIGN PATENT DOCUMENTS

| EP | 0392602 A1 | 10/1990 |
| JP | 61-502612 A | 11/1986 |
| JP | 4-050260 A | 2/1992 |
| JP | 05-043798 A | 2/1993 |
| JP | 2646743 B2 | 8/1997 |
| JP | 2007-246583 A | 9/2007 |
| KR | 10-2009-0038510 A | 4/2009 |
| KR | 10-2012-0089912 A | 8/2012 |
| WO | 1999-006484 A1 | 2/1999 |
| WO | 2012/106319 A2 | 8/2012 |
| WO | 2014/073219 A1 | 5/2014 |
| WO | 2016/093465 A1 | 6/2016 |

OTHER PUBLICATIONS

Extended European Search Report in counterpart European Application No. 15200507.0 dated May 3, 2016, 5 pages.
Extended European Search Report in commonly owned European Application No. 15169615.0 dated Aug. 12, 2015, pp. 1-5
Office Action in commonly owned U.S. Appl. No. 14/721,745 dated May 9, 2016, pp. 1-8
Final Office Action in commonly owned U.S. Appl. No. 14/723,745 dated Sep. 28, 2016, pp. 1-9
International Search Report in commonly owned International Application No. PCT/KR2015/008831 dated Oct. 29, 2015, pp. 1-4.
Office Action in commonly owned U.S. Appl. No. 14/723,745 dated Jun. 6, 2017, pp. 1-10.
Office Action in commonly owned U.S. Appl. No. 15/533,047 dated Oct. 3, 2017, pp. 1-11.
Extended Search Report in commonly owned European Application No. 15868630.3 dated Jun. 2, 2018, pp. 1-7.

*Primary Examiner* — John E Uselding
(74) *Attorney, Agent, or Firm* — Additon, Higgins & Pendleton, P.A.

(57) ABSTRACT

A thermoplastic resin composition for automobiles and a molded part for automobiles manufactured using the same is disclosed. The thermoplastic resin composition for automobiles includes: a semi-aromatic polyamide resin; an aliphatic polyamide resin; a first chelating agent including an amino group and a carboxyl group acid or a salt thereof; a second chelating agent including a C1 to C10 (not including carbon of carboxyl group) aliphatic polyhydric carboxylic acid having two to four carboxyl groups; and fillers. The thermoplastic resin composition for automobiles can have good long-term thermal stability and can maintain mechanical properties despite exposure to high temperature for a long time, and thus can be easily applied to peripheral parts of an automobile engine compartment.

18 Claims, No Drawings

THERMOPLASTIC RESIN COMPOSITION AND MOLDED PART FOR AUTOMOBILES USING THE SAME

CROSS-REFERENCE TO RELATED APPLICATION

This application claims priority under 35 USC Section 119 to and the benefit of Korean Patent Application No. 10-2014-0184354, filed Dec. 19, 2014, and Korean Patent Application No. 10-2015-0156103, filed Nov. 6, 2015, in the Korean Intellectual Property Office, the entire disclosure of each of which is incorporated herein by reference.

FIELD

The present invention relates to a thermoplastic resin composition for automobiles.

BACKGROUND

Polyamide resins have good properties in terms of thermal resistance, wear resistance, chemical resistance and flame retardancy, and are thus used for a wide range of applications, such as electrical components, electronic components, automobile components, and the like.

With the trend of realizing excellent fuel efficiency, engine downsizing is in progress, and the number of automobiles having a turbocharger is increasing. Turbocharger parts are formed of a material having higher heat resistance because turbochargers are usually exposed to high temperature from engine output.

For example, parts in an under hood area (under-the-hood) are generally formed of polyamide resin compositions having good heat resistance, since the peripheral parts are exposed to high-temperature environments for a long time.

Generally, organic antioxidants such as phenol or phosphite antioxidants are broadly used to secure long-term thermal stability of polyamide resin compositions. However, the organic antioxidants have a limit in maintaining good physical properties of the polyamide resin compositions at high temperature for a long period of time.

In addition, a copper halide heat stabilizer, such as a CuI/KI mixture, known to exhibit good long-term thermal stability at high temperature as compared with organic antioxidants, can be used. However, copper can discolor or precipitate over time, thereby causing a problem in use for electrical, electronic, and automobile components.

Therefore, there is a need for polyamide resin compositions capable of maintaining high thermal stability despite exposure to high temperature for a long time in order to be used for peripheral parts of an automobile engine compartment.

SUMMARY OF THE INVENTION

Embodiments provide a thermoplastic resin composition for automobiles that can have good long-term thermal stability and processability to maintain mechanical strength for a long time.

The thermoplastic resin composition for automobiles can include: a semi-aromatic polyamide resin; an aliphatic polyamide resin; a first chelating agent including an amino group and at least one of a carboxyl group and a salt thereof; a second chelating agent including a C1 to C10 (not including carbon of carboxyl group) aliphatic polyhydric carboxylic acid having two to four carboxyl groups; and fillers.

The thermoplastic resin composition may include about 30 wt % to about 70 wt % of the semi-aromatic polyamide resin; about 1 wt % to about 20 wt % of the aliphatic polyamide resin; about 0.1 wt % to about 1 wt % of the first chelating agent; about 0.1 wt % to about 5 wt % of the second chelating agent; and about 10 wt % to about 60 wt % of the fillers.

The semi-aromatic polyamide resin and the aliphatic polymer resin may present in a weight ratio of about 1:0.05 to about 1:0.5.

The first chelating agent and the second chelating agent may present in a weight ratio of about 1:0.5 to about 1:10.

The fillers may include glass fibers.

The semi-aromatic polyamide resin may include a repeat unit which includes a dicarboxylic acid derived unit including about 10 mol % to about 100 mol % of an aromatic dicarboxylic acid; and an aliphatic diamine and/or alicyclic diamine derived unit.

The semi-aromatic polyamide resin may include at least one of polyamide (PA6T/66) consisting of hexamethylene terephthalamide and hexamethylene adipamide, and polyamide (PA6T/DT) consisting of hexamethylene terephthalamide and 2-methylpentamethylene terephthalamide.

The semi-aromatic polyamide resin may have a glass transition temperature (Tg) of about 80° C. to about 150° C.

The aliphatic polyamide resin may include at least one of polyamide 6 and polyamide 66.

The aliphatic polyamide resin may have a glass transition temperature (Tg) of about 30° C. to about 80° C.

The first chelating agent may include at least one selected from the group consisting of ethylenediamine-N,N,N',N'-tetraacetic acid (EDTA), ethylene glycol bis(2-aminoethylether)-N,N,N',N'-tetraacetic acid (EGTA), trans-1,2-diaminocyclohexane-N,N,N,N-tetraacetic acid (CyDTA), diethylene triamine pentaacetic acid (DTPA), triethylenetetramine-N,N,N',N'',N''',N'''-hexaacetic acid (TETHA), N-(2-hydroxyethyl)ethylenediamine triacetic acid (HEDTA), and metal salts thereof.

The first chelating agent may include at least one metal ion selected from sodium (Na), aluminum (Al), iron (Fe), copper (Cu), zinc (Zn), tin (Sn), titanium (Ti), nickel (Ni), antimony (Sb), magnesium (Mg), vanadium (V), chromium (Cr), and zirconium (Zr) ions.

The second chelating agent includes at least one selected from the group consisting of fumaric acid, succinic acid, 3,3-diethylsuccinic acid, malonic acid, dimethylmalonic acid, tartaric acid, maleic acid, citric acid, malic acid, adipic acid, 2-methyladipic acid, trimethyladipic acid, itaconic acid, glutaric acid, 2,2-dimethylglutaric acid, pimelic acid, azelaic acid, dimer acid, sebacic acid, suberic acid, decanedicarboxylic acid, dodecane dicarboxylic acid, citraconic acid, tetrahydrophthalic acid, 1,2,3,4-butanetetracarboxylic acid, oxalic acid, and mixtures thereof.

Embodiments also provide a molded part for automobiles manufactured from the thermoplastic resin composition for automobiles.

The molded part may have an initial tensile strength $a_0$ after being left at 23° C. and 50% relative humidity (RH) for 48 hours measured in accordance with ASTM D638 and a tensile strength $a_1$ after being left at 220° C. for 500 hours also measured in accordance with ASTM D638, wherein the molded part can have a tensile strength retention ratio range of $a_1$ and $a_0$ represented by the following Equation 1:

$$85 \leq \frac{a_1}{a_0} \times 100 \leq 100. \quad \text{[Equation 1]}$$

The molded part may have an initial tensile strength $a_0$ after being left at 23° C. and 50% relative humidity (RH) for 48 hours measured in accordance with ASTM D638 and a tensile strength $a_2$ after being left at 220° C. for 1,000 hours also measured in accordance with ASTM D638, wherein the molded part can have a tensile strength retention ratio range of $a_2$ and $a_0$ represented by the following Equation 2:

$$70 \le \frac{a_2}{a_0} \times 100 \le 100. \quad \text{[Equation 2]}$$

The molded part may have a gas generation amount represented by the following Equation 3, as measured by weighing 5 g of the molded part in a Petri dish, covering the dish with a dish cap, placing the dish on a hot plate at 330° C. for 2 hours, followed by measuring the amount of volatile substances adsorbed to the dish cap.

$$50 \le \frac{C - C_0}{S} \times 10^6 \le 900, \quad \text{[Equation 3]}$$

wherein C is a weight of the dish cap after evaluation, $C_0$ is a weight of the dish cap before evaluation, and S is a weight of the molded part used for evaluation.

The molded part may be at least one of under hood parts.

The molded part may be a battery fuse terminal, turbo resonator and/or intercooler tank.

The thermoplastic resin composition for automobiles according to the present invention can stably maintain initial physical properties at high temperature for a long time. In addition, the thermoplastic resin composition for automobiles according to the present invention can generate a low amount of gas upon processing, thereby facilitating processing. Further, the thermoplastic resin composition for automobiles according to the present invention can have good fluidity.

The present invention is not limited to the advantageous effects as set forth above, and other advantageous effects of the present invention will be clearly understood by those skilled in the art from the claims.

DETAILED DESCRIPTION

The aspects, features, and advantages of the present invention will become apparent from the detailed description of the following embodiments, in which some, but not all, embodiments are described. It should be understood that the present invention is not limited to the following embodiments and may be embodied in different ways by those skilled in the art without departing from the scope of the present invention. Rather, the embodiments are provided so that this disclosure will satisfy applicable legal requirements and to provide thorough understanding of the present invention by those skilled in the art. The scope of the present invention should be defined only by the appended claims.

Unless otherwise defined herein, all terms including technical or scientific terms used herein have the same meanings as commonly understood by those skilled in the art to which the present invention pertains. It will be further understood that terms, such as those defined in commonly used dictionaries, should not be interpreted in an idealized or overly formal sense unless expressly so defined herein.

Hereinafter, a thermoplastic resin composition for automobiles according to the present invention will be described.

A thermoplastic resin composition for automobiles according to exemplary embodiments may include a polyamide resin, a chelating agent, and fillers, in which the polyamide resin may include a semi-aromatic polyamide resin and an aliphatic polyamide resin, and the chelating agent may include a first chelating agent and a second chelating agent.

As used herein, the terms "first chelating agent" and "second chelating agent" are used only to distinguish kinds of chelating agents and do not affect the scope of the claims.

Components of the thermoplastic resin composition for automobiles according to the embodiment of the present invention will be described in detail.

Polyamide Resin

The polyamide resin includes both the semi-aromatic polyamide resin and the aliphatic polyamide resin, thereby improving not only long-term thermal stability but also fluidity and processability.

Semi-Aromatic Polyamide Resin

The semi-aromatic polyamide resin may include a semi-aromatic polyamide resin having high heat resistance.

The semi-aromatic polyamide resin may be a homopolymer, a copolymer, a terpolymer and/or a polymer derived from more than three different monomers, which is formed from monomers having an aromatic group. As used herein, the term "copolymer" refers to a polyamide having repeat units of two or more amide and/or diamide molecules.

The semi-aromatic polyamide resin has a structure including an aromatic compound in a main chain. The semi-aromatic polyamide resin may be prepared by condensation polymerization of a dicarboxylic acid monomer component including about 10% by mole (mol %) to about 100 mol % of an aromatic dicarboxylic acid; and a diamine monomer component including an aliphatic diamine and/or alicyclic diamine monomer. The semi-aromatic polyamide resin includes a repeat unit which includes a dicarboxylic acid derived unit; and an aliphatic diamine and/or alicyclic diamine derived unit.

The dicarboxylic acid derived unit may be derived from an aromatic dicarboxylic acid including an aromatic benzene ring in the molecule. Examples of the aromatic dicarboxylic acid may include without limitation terephthalic acid, isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, and the like, and mixtures thereof.

The dicarboxylic acid derived unit may include about 10% by mole (mol %) to about 100 mol % of the aromatic dicarboxylic acid. In some embodiments, the dicarboxylic acid derived unit can include the aromatic dicarboxylic acid in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %. Further, according to some embodiments of the present invention, the aromatic dicarboxylic acid may be present in an amount of from about any of the foregoing amounts to about any other of the foregoing amounts.

The dicarboxylic acid derived unit may further include a unit derived from a non-aromatic dicarboxylic acid in addition to the aromatic dicarboxylic acid. The non-aromatic dicarboxylic acid may be an aliphatic and/or alicyclic dicarboxylic acid. Examples of the non-aromatic dicarboxylic acid may include without limitation aliphatic dicarboxylic acids, such as malonic acid, dimethylmalonic acid, succinic acid, glutaric acid, adipic acid, 2-methyladipic acid, trimethyladipic acid, pimelic acid, 2,2-dimethylglutaric acid, 2,2-diethylsuccinic acid, azelaic acid, sebacic acid, suberic acid and the like; alicyclic dicarboxylic acids, such as 1,3-cyclopentanedicarboxylic acid, 1,4-cyclohexanedicarboxylic acid, and the like. The non-aromatic dicarboxylic acid may be used alone or in combination of two or more.

The dicarboxylic acid derived unit may include the non-aromatic dicarboxylic acid in an amount of 90 mol % or less, for example about 80 mol % or less, about 70 mol % or less, or about 60 mol % or less. In some embodiments, the dicarboxylic acid derived unit can include the non-aromatic dicarboxylic acid in an amount of 0 (the non-aromatic carboxylic acid is not present), about 0 (the non-aromatic carboxylic acid is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 mol %. Further, according to some embodiments of the present invention, the non-aromatic dicarboxylic acid may be present in an amount of from about any of the foregoing amounts to about any other of the foregoing amounts.

The aliphatic diamine monomer and/or alicyclic diamine monomer may have 4 to 20 carbons. The aliphatic diamine unit may be derived from, for example, a $C_4$ to $C_{18}$ aliphatic alkylene diamine.

Examples of the $C_4$ to $C_{18}$ aliphatic alkylene diamine may include without limitation linear aliphatic alkylene diamines such as 1,6-hexanediamine, 1,7-heptanediamine, 1,8-octanediamine, 1,9-nonanediamine, 1,10-decanediamine, 1,11-undecanediamine, 1,12-dodecanediamine, and the like; branched aliphatic alkylene diamines such as 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-penthanediamine, 3-methyl-1,5-penthanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-diethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, 5-methyl-1,9-nonanediamine, and the like; and mixtures thereof.

In exemplary embodiments, the aliphatic diamine unit may include at least one diamine derived from, for example, 1,6-hexanediamine, 1,7-heptanediamine, 1,10-decanediamine, 1,11-undecanediamine, 1,12-dodecanediamine, 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-penthanediamine, 3-methyl-1,5-penthanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-diethyl-1,7-heptanediamine, 2,3-dimethyl-1,7-heptanediamine, 2,4-dimethyl-1,7-heptanediamine, and/or 2,5-dimethyl-1,7-heptanediamine.

Examples of the semi-aromatic polyamide resin may include without limitation polyamide (PA6T/66) consisting of hexamethylene terephthalamide and hexamethylene adipamide, polyamide (PA6T/DT) consisting of hexamethylene terephthalamide and 2-methylpentamethylene terephthalamide, and the like and mixtures thereof. In exemplary embodiments, PA6T/66 may be used.

The semi-aromatic polyamide resin is a resin capable of exhibiting high heat resistance, and may have a glass transition temperature (Tg) of about 80° C. to about 150° C., for example about 85° C. to 120° C.

The semi-aromatic polyamide resin is not specifically limited in terms of molecular weight and can have an intrinsic viscosity (IV) of about 0.75 or greater, for example about 0.75 to about 1.15. The intrinsic viscosity (IV) is measured at 25° C. after dissolution in a 98% sulfuric acid solution.

The thermoplastic resin composition may include the semi-aromatic polyamide resin in an amount of about 30% by weight (wt %) to about 70 wt %, for example about 40 wt % to about 60 wt %, based on the total weight (100 wt %) of the thermoplastic resin composition for automobiles. In some embodiments, the thermoplastic resin composition can include the semi-aromatic polyamide resin in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the semi-aromatic polyamide resin may be present in an amount of from about any of the foregoing amounts to about any other of the foregoing amounts.

Within these ranges, the thermoplastic resin composition can exhibit good impact strength and processability.

Aliphatic Polyamide Resin

The aliphatic polyamide resin is a polyamide containing no aromatic ring in the molecular chain, and may contain a $C_{10}$ to $C_{20}$ aliphatic group.

The aliphatic polyamide resin may be a homopolymer, a copolymer, a terpolymer and/or a polymer derived from more than three different monomers. The monomers can include diamine monomers selected from aminocarboxylic acid, lactam and/or diamine monomers, and dicarboxylic acid monomers. As used herein, the term "copolymer" refers to a polyamide having repeat units of two or more amide and/or diamide molecules.

Examples of the aminocarboxylic acid may include without limitation $C_6$ to $C_{12}$ aminocarboxylic acids, for example 6-aminocapronic acid, 7-aminoheptanic acid, 9-aminononanic acid, 11-aminoundecanic acid, 12-aminododecanic acid, and the like, and mixtures thereof.

Examples of the lactam may include without limitation $C_4$ to $C_{12}$ lactams, for example α-pyrrolidone, ε-caprolactam, ω-laurolactam, ε-enantlactam, and the like, and mixtures thereof.

The diamine may be an aliphatic diamine and/or alicyclic diamine. The aliphatic diamine monomer and/or alicyclic diamine monomer may have 4 to 20 carbons. Examples of the diamine may include without limitation tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, bis(p-aminocyclohexyl)methane, 2-methyloctamethylenediamine, trimethylhexamethylenediamine, 1,8-diaminooctane, 1,9-diaminononane, 1,10-diaminodecane, 1,12-diaminododecane, the like, and mixtures thereof.

The dicarboxylic acid may be an aliphatic and/or alicyclic dicarboxylic acid. Examples of the dicarboxylic acid may include without limitation adipic acid, 2-methyladipic acid, trimethyladipic acid, glutaric acid, 2,2-dimethylglutaric acid, pimelic acid, suberic acid, azelaic acid, sebacic acid, dodecanedioic acid, 1,4-cyclohexanedicarboxylic acid, malonic acid, dimethylmalonic acid, succinic acid, 2,2-diethylsuccinic acid, and the like, and mixtures thereof.

Examples of the aliphatic polyamide resin may include without limitation polyamide 6, polyamide 66, polyamide 46, polyamide 610, polyamide 612, polyamide 11, polyamide 12, polyamide 910, polyamide 912, polyamide 913, polyamide 914, polyamide 915, polyamide 616, polyamide 936, polyamide 1010, polyamide 1012, polyamide 1013, polyamide 1014, polyamide 1210, polyamide 1212, polyamide 1213, polyamide 1214, polyamide 614, polyamide 613, polyamide 615, polyamide 616, and the like, and mixtures thereof.

In exemplary embodiments, the aliphatic polyamide resin may include polyamide 6 and/or polyamide 66. A mixture of polyamide 6 and polyamide 66 may also be used, as needed.

The aliphatic polyamide resin may have a glass transition temperature (Tg) of about 30° C. to about 80° C., for example about 35° C. to about 50° C. Further, the aliphatic polyamide resin may have a melting point of about 160° C. to about 210° C. When the aliphatic polyamide resin has a glass transition and melting point within these ranges, the thermoplastic resin composition can exhibit good impact strength and processability.

The aliphatic polyamide resin can have a number average molecular weight (Mn) of about 10,000 g/mol to about 200,000 g/mol, for example about 20,000 g/mol to about 150,000 g/mol, without being limited thereto.

The thermoplastic resin composition may include the aliphatic polyamide resin in an amount of about 1 wt % to about 20 wt %, for example about 3 wt % to about 15 wt %, based on the total amount (100 wt %) of the thermoplastic resin composition for automobiles. In some embodiments, the thermoplastic resin composition may include the aliphatic polyamide resin in an amount of about 1, 2, 3, 4, 5, 6, 7, 8, 9, 10, 11, 12, 13, 14, 15, 16, 17, 18, 19, or 20 wt %. Further, according to some embodiments of the present invention, the aliphatic polyamide resin may be present in an amount of from about any of the foregoing amounts to about any other of the foregoing amounts.

When the aliphatic polyamide resin is not present in an amount within this range, the thermoplastic resin composition can exhibit poor heat resistance and/or mechanical strength.

In the present invention, a mixture of the semi-aromatic polyamide resin and the aliphatic polyamide resin is used to achieve good long-term thermal stability. The weight ratio of the semi-aromatic polyamide resin to the aliphatic polyamide resin may range from about 1:0.05 to about 1:0.5, for example about 1:0.08 to about 1:0.2. Within this range, the thermoplastic resin composition can exhibit further improved long-term thermal stability and can generate a low amount of gas upon processing to facilitate extrusion and other processing.

Chelating Agent

The thermoplastic resin composition for automobiles may use two kinds of chelating agents including the first chelating agent and the second chelating agent.

First Chelating Agent

The first chelating agent is a compound having a functional group capable of forming a bond with a metal ion in the molecular structure, and can be bonded to a cation of a metal salt, which is dissociated into the cation and an anion, thereby forming a stabilized chelate complex compound.

The first chelating agent may include an amino group and at least one of a carboxyl group and a salt thereof.

As the first chelating agent, compounds having a polyvalent carboxyl group may be used alone or as a mixture thereof. For example, the first chelating agent may be a compound having a polycarboxylic acid or carboxylate group which contains a functional group represented by Formula 1a, 1b and/or 1c.

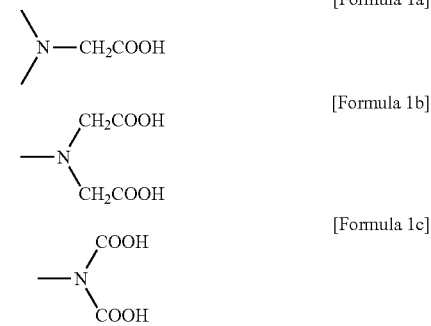

Examples of compounds containing the functional groups represented by Formulae 1a to 1c include without limitation ethylenediamine-N,N,N',N'-tetraacetic acid (EDTA), ethylene glycol bis(2-aminoethylether)-N,N,N',N'-tetraacetic acid (EGTA), trans-1,2-diaminocyclohexane-N,N,N',N'-tetraacetic acid (CyDTA), diethylene triamine pentaacetic acid (DTPA), triethylenetetramine-N,N,N',N'',N''',N''''-hexaacetic acid (TETHA), N-(2-hydroxyethyl)ethylenediamine triacetic acid (HEDTA), metal salts thereof, and the like, which may also be used as a mixture thereof.

A metal ion bonding with the first chelating agent may include at least one of sodium (Na), aluminum (Al), iron (Fe), copper (Cu), zinc (Zn), tin (Sn), titanium (Ti), nickel (Ni), antimony (Sb), magnesium (Mg), vanadium (V), chromium (Cr), and zirconium (Zr) ions. Any metal ion which exhibits the same effects may be used as the first chelating agent, without being limited thereto.

In exemplary embodiments, ethylenediamine tetraacetic acid-disodium salt (EDTA-2Na) may be used.

The thermoplastic resin composition may include the first chelating agent in an amount of about 0.1 wt % to about 1 wt %, for example about 0.5 wt % to about 0.9 wt %, based on the total amount (100 wt %) of the thermoplastic resin composition for automobiles. In some embodiments, the thermoplastic resin composition may include the first chelating agent in an amount of about 0.1, 0.2, 0.3, 0.4, 0.5, 0.6, 0.7, 0.8, 0.9, or 1 wt %. Further, according to some embodiments of the present invention, the first chelating agent may be present in an amount of from about any of the foregoing amounts to about any other of the foregoing amounts.

Within this range, the first chelating agent can have a good effect of improving long-term thermal stability of the thermoplastic resin composition, and the thermoplastic resin composition can reduce gas generation during a manufacturing process to improve processability, has improved mechanical strength, and does not suffer from discoloration.

Second Chelating Agent

The second chelating agent may include a $C_1$ to $C_{10}$ (not including carbon of any carboxyl group) aliphatic polyhydric carboxylic acid having two to four carboxyl groups, carboxylic acid derivatives, such as acid anhydrides, acid chlorides and/or esters of $C_1$ to $C_{10}$ (not including carbon of any carboxyl group) aliphatic polyhydric carboxylic acids, and the like, and mixtures thereof.

Examples of the second chelating agent may include without limitation fumaric acid, succinic acid, 3,3-diethylsuccinic acid, malonic acid, dimethylmalonic acid, tartaric acid, maleic acid, citric acid, malic acid, adipic acid, 2-methyladipic acid, trimethyladipic acid, itaconic acid, glutaric acid, 2,2-dimethylglutaric acid, pimelic acid, azelaic acid, dimer acid, sebacic acid, suberic acid, decanedicarboxylic acid, dodecane dicarboxylic acid, citraconic acid, tetrahydrophthalic acid, 1,2,3,4-butanetetracarboxylic acid, oxalic acid, and the like, and mixtures thereof.

Any aliphatic polyhydric carboxylic acid which exhibits the same effect may be used for the second chelating agent, without being limited thereto. In exemplary embodiments, citric acid may be used.

The thermoplastic resin composition may include the second chelating agent in an amount of about 0.1 wt % to about 5 wt %, based on the total weight (100 wt %) of the thermoplastic resin composition for automobiles. In some embodiments, the thermoplastic resin composition may include the second chelating agent in an amount of about 0.1, 0.2, 0.3, 0.4, 0.5, 0.6, 0.7, 0.8, 0.9, 1, 2, 3, 4, or 5 wt %. Further, according to some embodiments of the present invention, the second chelating agent may be present in an amount of from about any of the foregoing amounts to about any other of the foregoing amounts.

Within this range, the second chelating agent can stably contribute to improve long-term thermal stability of the thermoplastic resin composition together with the first chelating agent.

The first chelating agent and the second chelating agent oxidize a surface upon aging at high temperature to accelerate formation of char on the surface, thereby preventing infiltration of an oxidized layer into a thermoplastic resin and thus avoiding decomposition of the thermoplastic resin. Accordingly, improvement in long-term thermal stability of the thermoplastic resin composition can be achieved.

The first chelating agent and the second chelating agent also can react with a sizing material of glass fibers to improve long-term thermal stability of the thermoplastic resin composition.

In the present invention, a mixture of the first chelating agent and the second chelating agent is used to achieve good long-term thermal stability. The weight ratio of the first chelating agent to the second chelating agent may range from about 1:0.5 to about 1:10, for example from about 1:1 to about 1:10, and as another example from about 1:2 to about 1:10. Within this range, the effect of preventing decomposition of the thermoplastic resin of the resin composition upon aging at high temperature can be further improved.

Filler

The thermoplastic resin composition for automobiles includes the fillers and can secure mechanical strength at a desired level by adjusting the amount of the fillers.

In exemplary embodiments, the fillers may include glass fibers.

The glass fibers may be typical glass fibers used in the art, and may have a diameter of about 8 μm to about 20 μm and a length of about 1.5 mm to about 8 mm. Within this range of glass fiber diameter, the glass fibers can provide good reinforcement effects. Within this range of glass fiber length, the thermoplastic resin composition can be easily put into a processing machine such as an extruder and reinforcement effects by the glass fibers can be significantly improved.

The glass fibers may be used as a mixture with fibers selected from the group consisting of carbon fibers, basalt fibers, fibers made from biomass, and mixtures thereof. Biomass refers to plants or microorganisms that can be used as energy sources.

The glass fibers may have a circular cross-section, an oval cross-section, a rectangular cross-section, and/or a two-connected-circle shaped cross-section, that is, a dumbbell-shaped cross-section.

The cross-section of the glass fibers can have an aspect ratio of about 1 to about 8. As used herein, the aspect ratio is defined as a ratio of the shortest diameter to the longest diameter of the cross-section of the glass fibers. For example, a glass fiber with a circular cross sectional shape and an aspect ratio of 1 may be used. Use of the glass fibers having a cross-section with an aspect ratio within the above range can reduce a unit cost of a product. Use of glass fibers having a circular cross-section can enhance dimensional stability and appearance.

The glass fibers may be subjected to surface treatment with a sizing material in order to prevent reaction with the resin and to improve impregnation degree. Surface treatment of the glass fibers may be performed during manufacture of the glass fibers or through post processing.

The filler may be used along with the second chelating agent to further increase an effect of improving long-term thermal stability.

For example, when the glass fibers are used as the fillers, the glass fibers may be subjected to surface treatment in which surfaces of hair-like filaments are coated with a chemical mixture, which is called sizing. Generally, sizing is used to protect filaments from friction occurring on a contact surface in all processes to which the glass fibers are subjected or to impart a function of facilitating bonding between the glass fibers and the resin.

The first chelating agent and the second chelating agent can react with the sizing material of the glass fiber, thereby improving long-term thermal stability.

For example, strength of the glass fibers depends on a silicate network structure, and alkali oxide of the glass fibers is not easily integrated into the silicate network structure, causing deterioration in strength. However, as in the present invention, when the first chelating agent and the second chelating agent are used together, the first chelating agent and the second chelating agent can combine with the sizing material of the glass fibers to suppress action of alkali oxide, thereby maintaining strength despite long-term exposure to high temperature.

The thermoplastic resin composition can include the fillers in an amount of about 10 wt % to about 60 wt %, for example about 20 wt % to about 50 wt %, based on the total weight (100 wt %) of the thermoplastic resin composition for automobiles. In some embodiments, the thermoplastic resin composition can include the fillers in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments of the present invention, the fillers may be present in an amount of from about any of the foregoing amounts to about any other of the foregoing amounts.

Within this range, the thermoplastic resin composition can exhibit improved strength and further improved long-term thermal stability.

In exemplary embodiments, the thermoplastic resin composition for automobiles may further include one or more additives depending on purposes.

Examples of the additive may include without limitation dyes, pigments, heat stabilizers, UV stabilizers, lubricants, antimicrobials, release agents, nucleating agents, antistatic agents, antioxidants, inorganic additives, and the like. These additives may be used alone or in combination thereof.

The thermoplastic resin composition for automobiles uses the first chelating agent and the second chelating agent, and a mixture of two kinds of polyamides, thereby exhibiting good long-term thermal stability, fluidity, and processability with minimal or no deterioration of other physical properties of the polyamide resins, such as wear resistance, chemical resistance, flame retardancy, and mechanical strength.

The thermoplastic resin composition for automobiles according to the present invention may be prepared by any known method. For example, the thermoplastic resin composition may be prepared in pellet form by mixing the components of the present invention and other optional additives, followed by melt extrusion in an extruder.

A molded part for automobiles according to one embodiment of the present invention may be manufactured from the thermoplastic resin composition for automobiles as set forth above. The molded part for automobiles can have good long-term thermal stability and processability.

The molded part may have an initial tensile strength $a_0$ after being left at 23° C. and 50% relative humidity (RH) for 48 hours measured in accordance with ASTM D638 and a tensile strength $a_1$ after being left at 220° C. for 500 hours also measured in accordance with ASTM D638, wherein the molded part can have a tensile strength retention ratio range of $a_1$ and $a_0$ represented by the following Equation 1:

$$85 \leq \frac{a_1}{a_0} \times 100 \leq 100. \quad \text{[Equation 1]}$$

The molded part may have an initial tensile strength $a_0$ after being left at 23° C. and 50% relative humidity (RH) for 48 hours measured in accordance with ASTM D638 and a tensile strength $a_2$ after being left at 220° C. for 1,000 hours also measured in accordance with ASTM D638, wherein the molded part can have a tensile strength retention ratio range of $a_2$ and $a_0$ represented by the following Equation 2:

$$70 \leq \frac{a_2}{a_0} \times 100 \leq 100. \quad \text{[Equation 2]}$$

The molded part may have a gas generation amount represented by the following Equation 3, as measured by weighing 5 g of the molded part in a Petri dish, covering the dish with a dish cap, placing the dish on a hot plate at 330° C. for 2 hours, followed by measuring the amount of volatile substances adsorbed to the dish cap.

$$50 \leq \frac{C - C_0}{S} \times 10^6 \leq 900, \quad \text{[Equation 3]}$$

wherein C is a weight of the dish cap after evaluation, $C_0$ is a weight of the dish cap before evaluation, and S is a weight of the molded part used for evaluation.

The molded part may be used as a molded part for automobiles required to have long-term thermal stability and fluidity. For example, the molded part may be at least one of under hood parts, such as but not limited to a battery fuse terminal, turbo resonator and/or intercooler tank. As other examples, the molded part may be used with a water temperature controller, a thermostat housing, and/or a fuel rail for automobiles.

EXAMPLES

Next, the present invention will be described in more detail with reference to the following examples. It should be understood that these examples are provided for illustration only and are not to be construed in any way as limiting the present invention.

Details of components used for thermoplastic resin compositions of Examples and Comparative Examples are as follows.

(a) Polyamide resin
(a-1) PA6T/66 A6000 (AMODEL® PPA A6000, polyphthalamide, Tg: 88° C., Solvay Specialty Polymers Co., Ltd.)
(a-2) Polyamide 66 Vydyne (Vydyne®PA66, Tg: 60° C., Ascend Performance Materials LLC)
(a-3) Polyamide 6 TP 4208 (Zig Sheng Industrial Co., Ltd.)
(b) Chelating agent
(b-1) EDTA-2Na (Dow Chemical Company)
(b-2) Citric acid anhydride (Samchun Chemical Co., Ltd.)
(c) Filler
Glass fibers having an oval cross-section, a diameter of 10 μm and a chop length of 4 mm (983, Owens Corning Co., Ltd.)
(d) Thermal stabilizer
A CuI/KI mixture TP-H9008 (Brueggemann Chemical Co., Ltd.)

Components as listed in Table 1 are introduced into a mixer, followed by dry mixing. Next, the mixture is placed in a twin-screw extruder having an L/D of 45 and Φ of 44 mm, thereby preparing a thermoplastic resin composition in pellet form through the extruder. The prepared pellets are formed into specimens for evaluation of physical properties using a 10 oz. injection molding machine set to 280° C.

The content of each of the components as listed in Table 1 is given in wt %.

TABLE 1

|  |  | (a-1) | (a-2) | (a-3) | (b-1) | (b-2) | (c) | (d) |
|---|---|---|---|---|---|---|---|---|
| Example | 1 | 58.5 | 5 | — | 0.5 | 1 | 35 | — |
|  | 2 | 53.5 | 10 | — | 0.5 | 1 | 35 | — |
|  | 3 | 63.5 | — | 10 | 0.5 | 1 | 35 | — |
|  | 4 | 58.9 | 5 | — | 0.1 | 1 | 35 | — |
|  | 5 | 58.1 | 5 | — | 0.9 | 1 | 35 | — |

TABLE 1-continued

|  |  | (a-1) | (a-2) | (a-3) | (b-1) | (b-2) | (c) | (d) |
|---|---|---|---|---|---|---|---|---|
| Comparative | 1 | 64.8 | — | — | — | — | 35 | 0.2 |
| Example | 2 | 63.5 | — | — | 0.5 | 1 | 35 | — |
|  | 3 | 62.5 | — | — | 0.5 | 2 | 35 | — |
|  | 4 | 59.8 | 5 | — | — | — | 35 | 0.2 |
|  | 5 | 54.8 | 10 | — | — | — | 35 | 0.2 |
|  | 6 | 59.5 | 5 | — | 0.5 | — | 35 | — |
|  | 7 | 59 | 5 | — | — | 1 | 35 | — |

Each of the thermoplastic resin compositions prepared in Examples 1 to 5 and Comparative Examples 1 to 7 is evaluated as to long-term thermal stability and gas generation amount. The evaluations are performed by the following methods, and evaluation results are shown in Table 2.

<Evaluation of Long-Term Thermal Stability>

(1) A portion of each specimen manufactured using each of the thermoplastic resin compositions prepared in Examples 1 to 5 and Comparative Examples 1 to 7 is left at 23° C. and 50% relative humidity (RH) for 48 hours, followed by measuring initial tensile strength ($a_0$) in accordance with ASTM D638. Here, tensile strength measurement speed was 5 mm/min. Subsequently, a remaining portion of each specimen is left at 220° C. for 500 hours, followed by measuring tensile strength ($a_1$) also in accordance with ASTM D638. Long-term thermal stability is evaluated based on a tensile strength retention ratio calculated by the following Equation 4.

$$\frac{a_1}{a_0} \times 100(\%) \quad \text{[Equation 4]}$$

(2) A portion of each specimen manufactured using each of the thermoplastic resin compositions prepared in Examples 1 to 5 and Comparative Examples 1 to 7 is left at 23° C. and 50% RH for 48 hours, followed by measuring initial tensile strength ($a_0$) in accordance with ASTM D638. Here, tensile strength measurement speed is 5 mm/min. Subsequently, a remaining portion of each specimen is left at 220° C. for 1,000 hours, followed by measuring tensile strength ($a_2$) also in accordance with ASTM D638. Long-term thermal stability is evaluated based on a tensile strength retention ratio calculated by the following Equation 5.

$$\frac{a_2}{a_0} \times 100(\%). \quad \text{[Equation 5]}$$

<Evaluation of Gas Generation Amount>

About 5 g of pellets prepared from each of the thermoplastic resin compositions prepared in Examples 1 to 5 and Comparative Examples 1 to 7 is weighed in a Petri dish and covered with a dish cap. Then, the dish is placed on a hot plate at 330° C. for 2 hours, followed by measuring the amount of volatile substances adsorbed to the dish cap. The amount of gas generated is calculated by Equation 6.

$$\frac{C - C_0}{S} \times 10^6 (\text{ppm}), \quad \text{[Equation 6]}$$

wherein C is the weight of the dish cap after evaluation, $C_0$ is the weight of the dish cap before evaluation, and S is the weight of the molded part for automobiles used for evaluation.

TABLE 2

|  |  | Long-term thermal stability (1) | | | Long-term thermal stability (2) | | | |
|---|---|---|---|---|---|---|---|---|
|  |  | Initial tensile strength (kg/cm²) | Tensile strength after 500 hours (kg/cm²) | Tensile strength retention ratio after 500 hours (%) | Initial tensile strength (kg/cm²) | Tensile strength after 1,000 hours (kg/cm²) | Tensile strength retention ratio after 1,000 hours (%) | Gas generation amount (ppm) |
| Example | 1 | 2094 | 2028 | 97 | 2094 | 1594 | 76 | 180 |
|  | 2 | 2148 | 2084 | 97 | 2148 | 1951 | 91 | 350 |
|  | 3 | 2012 | 1985 | 99 | 1985 | 1945 | 98 | 720 |
|  | 4 | 2018 | 1816 | 90 | 2018 | 1493 | 74 | 190 |
|  | 5 | 2011 | 1850 | 92 | 2011 | 1508 | 75 | 510 |
| Comparative | 1 | 1917 | 1258 | 66 | 1917 | 900 | 47 | 150 |
| Example | 2 | 2068 | 1810 | 88 | 2068 | 1251 | 60 | 550 |
|  | 3 | 2071 | 1921 | 93 | 2071 | 1314 | 63 | 720 |
|  | 4 | 2035 | 1424 | 70 | 2035 | 977 | 48 | 530 |
|  | 5 | 2021 | 1455 | 72 | 2021 | 1031 | 51 | 620 |
|  | 6 | 2013 | 1107 | 55 | 2013 | 866 | 43 | 230 |
|  | 7 | 1955 | 1173 | 60 | 1955 | 821 | 42 | 420 |

From Tables 1 and 2, it can be seen that the thermoplastic resin compositions prepared in Examples 1 to 5 have good long-term thermal stability and generated a small amount of gas to have good processability.

When a copper halide compound is used as a typical heat stabilizer (Comparative Examples 1, 4, and 5), the thermoplastic resin compositions have much lower long-term thermal stability than the thermoplastic resin compositions according to the present invention.

Further, when only a semi-aromatic polyamide is used as a polyamide (Comparative Examples 2 and 3), the tensile strength retention ratio of the resin composition is reduced as compared with that of the composition according to the present invention. That is, when two kinds of polyamides are used in a certain ratio, the thermoplastic resin compositions can maintain high tensile strength despite exposure to high temperature for a long time.

Further, when only one of the first chelating agent or the second chelating agent is used (Comparative Examples 6 and 7), long-term thermal stability and processability of the thermoplastic resin composition could not be simultaneously improved.

Thus, it can be seen that the kinds and contents of polyamides and the kinds and contents of chelating agents are factors considerably affecting long-term thermal stability and processability of the thermoplastic resin compositions according to the present invention.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. A thermoplastic resin composition for automobiles comprising:
   about 30 wt % to about 70 wt % of a semi-aromatic polyamide resin;
   about 1 wt % to about 20 wt % of an aliphatic polyamide resin;
   0.1 wt % to 0.9 wt % of a first chelating agent comprising ethylenediamine-N,N,N',N'-tetraacetic acid (EDTA) and/or a metal salt thereof;
   about 0.1 wt % to about 5 wt % of a second chelating agent comprising citric acid and/or an anhydride thereof; and
   about 10 wt % to about 60 wt % of filler, each based on 100 wt % of the thermoplastic resin composition for automobiles,
   wherein a specimen manufactured from the thermoplastic resin composition using an injection molding machine set to 280° C. has an initial tensile strength $a_0$ after being left at 23° C. and 50% relative humidity (RH) for 48 hours measured in accordance with ASTM D638 and a tensile strength $a_1$ after being left at 220° C. for 500 hours also measured in accordance with ASTM D638, wherein the specimen has a tensile strength retention ratio range of $a_1$ and $a_0$ represented by the following Equation 1:

$$85 \le \frac{a_1}{a_0} \times 100 \le 100;$$ [Equation 1]

and
   wherein the specimen manufactured from the thermoplastic resin composition using an injection molding machine set to 280° C. has an initial tensile strength $a_0$ after being left at 23° C. and 50% relative humidity (RH) for 48 hours measured in accordance with ASTM D638 and a tensile strength $a_2$ after being left at 220° C. for 1,000 hours also measured in accordance with ASTM D638, wherein the specimen has a tensile strength retention ratio range of $a_2$ and $a_0$ represented by the following Equation 2:

$$70 \le \frac{a_2}{a_0} \times 100 \le 100.$$ [Equation 2]

2. The thermoplastic resin composition for automobiles according to claim 1, comprising the semi-aromatic polyamide resin and the aliphatic polymer resin in a weight ratio of about 1:0.05 to about 1:0.5.

3. The thermoplastic resin composition for automobiles according to claim 1, comprising the first chelating agent and the second chelating agent in a weight ratio of about 1:0.5 to about 1:10.

4. The thermoplastic resin composition for automobiles according to claim 1, wherein the filler comprises glass fibers.

5. The thermoplastic resin composition for automobiles according to claim 1, wherein the semi-aromatic polyamide resin comprises a repeat unit which includes a dicarboxylic acid derived unit including about 10 mol % to 100 mol % of an aromatic dicarboxylic acid; and an aliphatic diamine and/or alicyclic diamine derived unit.

6. The thermoplastic resin composition for automobiles according to claim 1, wherein the semi-aromatic polyamide resin comprises polyamide PA6T/66 consisting of hexamethylene terephthalamide and hexamethylene adipamide, and/or polyamide PA6T/DT consisting of hexamethylene terephthalamide and 2-methylpentamethylene terephthalamide.

7. The thermoplastic resin composition for automobiles according to claim 1, wherein the semi-aromatic polyamide resin has a glass transition temperature (Tg) of about 80° C. to about 150° C.

8. The thermoplastic resin composition for automobiles according to claim 1, wherein the aliphatic polyamide resin comprises polyamide 6 and/or polyamide 66.

9. The thermoplastic resin composition for automobiles according to claim 1, wherein the aliphatic polyamide resin has a glass transition temperature (Tg) of about 30° C. to about 80° C.

10. The thermoplastic resin composition for automobiles according to claim 1, wherein the first chelating agent comprises at least one metal ion comprising sodium (Na), aluminum (Al), iron (Fe), copper (Cu), zinc (Zn), tin (Sn), titanium (Ti), nickel (Ni), antimony (Sb), magnesium (Mg), vanadium (V), chromium (Cr), zirconium (Zr) ions or a mixture thereof.

11. A molded part for automobiles manufactured from the thermoplastic resin composition for automobiles according to claim 1.

12. The molded part for automobiles according to claim 11, wherein the molded part has a gas generation amount represented by the following Equation 3, as measured by weighing 5 g of the molded part in a Petri dish, covering the dish with a dish cap, placing the dish on a hot plate at 330° C. for 2 hours, followed by measuring the amount of volatile substances adsorbed to the dish cap:

$$50 \le \frac{C - C_0}{S} \times 10^6 \le 900,$$ [Equation 3]

wherein C is a weight of the dish cap after evaluation, $C_0$ is a weight of the dish cap before evaluation, and S is a weight of the molded part used for evaluation.

13. The molded part for automobiles according to claim 11, wherein the molded part is an under hood part.

14. The molded part for automobiles according to claim 11, wherein the molded part is a battery fuse terminal, turbo resonator and/or intercooler tank.

15. The thermoplastic resin composition for automobiles according to claim 1, wherein:
   the semi-aromatic polyamide resin comprises polyamide PA6T/66 consisting of hexamethylene terephthalamide and hexamethylene adipamide and/or polyamide PA6T/DT consisting of hexamethylene terephthalamide and 2-methylpentamethylene terephthalamide;

the aliphatic polyamide resin comprises polyamide 6 and/or polyamide 66;

the filler comprises glass fiber.

16. The thermoplastic resin composition for automobiles according to claim 1, wherein:
   the semi-aromatic polyamide resin includes a dicarboxylic acid derived repeat unit derived from an aromatic dicarboxylic acid including a benzene ring; and an aliphatic diamine derived repeat unit derived from a $C_4$ to $C_{18}$ aliphatic alkylene diamine;
   the aliphatic polyamide resin includes: a repeat unit derived from a $C_4$ to $C_{12}$ lactam;
   and/or a dicarboxylic acid derived repeat unit derived from a $C_6$ to $C_{16}$ aliphatic dicarboxylic acid and an aliphatic diamine derived repeat unit derived from a $C_4$ to $C_{12}$ aliphatic alkylene diamine; and
   the filler comprises glass fiber.

17. The thermoplastic resin composition for automobiles according to claim 16, comprising:
   about 50 wt % to about 70 wt % of the semi-aromatic polyamide resin;
   about 3 wt % to about 15 wt % of the aliphatic polyamide resin; and
   about 20 wt % to about 50 wt % of the filler, each based on 100 w t% of the thermoplastic resin composition for automobiles.

18. The thermoplastic resin composition for automobiles according to claim 15, comprising:
   about 50 wt % to about 70 wt % of the semi-aromatic polyamide resin;
   about 3 wt % to about 15 wt % of the aliphatic polyamide resin; and
   about 20 wt % to about 50 wt % of the filler, each based on 100 wt % of the thermoplastic resin composition for automobiles.

* * * * *